(12) United States Patent
Matula et al.

(10) Patent No.: US 11,665,315 B2
(45) Date of Patent: May 30, 2023

(54) USER NOTIFICATION USING A LIGHT EMITTER ASSOCIATED WITH A VIDEO CAMERA

(71) Applicant: Avaya Management L.P., Santa Clara, CA (US)

(72) Inventors: Valentine C. Matula, Granville, OH (US); Shamik Shah, Pune (IN)

(73) Assignee: Avaya Management L.P., Santa Clara, CA (US)

(*) Notice: Subject to any disclaimer, the term of this patent is extended or adjusted under 35 U.S.C. 154(b) by 0 days.

(21) Appl. No.: 17/018,525

(22) Filed: Sep. 11, 2020

(65) Prior Publication Data

US 2022/0086391 A1    Mar. 17, 2022

(51) Int. Cl.
  *H04N 7/14*  (2006.01)
  *H04L 12/18*  (2006.01)
  *G08B 5/36*  (2006.01)

(52) U.S. Cl.
  CPC .............. *H04N 7/147* (2013.01); *G08B 5/36* (2013.01); *H04L 12/1831* (2013.01); *H04N 7/142* (2013.01)

(58) Field of Classification Search
  USPC ........................................................ 709/204
  See application file for complete search history.

(56) References Cited

U.S. PATENT DOCUMENTS

| | | | | |
|---|---|---|---|---|
| 6,046,767 A | * | 4/2000 | Smith | H04N 7/15 348/E7.083 |
| 7,050,084 B1 | * | 5/2006 | Lang | G03B 13/02 348/14.05 |
| 9,521,363 B1 | * | 12/2016 | Buchheit | H04N 23/64 |

* cited by examiner

*Primary Examiner* — Amal S Zenati (57) ABSTRACT

The technology disclosed herein enables user notifications via a light emitter associated with a video camera. In a particular embodiment, a method provides exchanging video user communications on the video communication session between a first endpoint operated by a first user and a second endpoint operated by a second user. The method further includes receiving video of the first user for inclusion in the video user communications using a video camera for the first endpoint and monitoring first behavior of the first user during the video communication session to determine whether the first behavior satisfies a notification criterion. In response to determining that the first behavior satisfies the notification criterion, the method includes directing a light emitter associated with the video camera to present a visual notification to the first user.

20 Claims, 8 Drawing Sheets

USER NOTIFICATION USING A LIGHT EMITTER ASSOCIATED WITH A VIDEO CAMERA

TECHNICAL BACKGROUND

When a user is on a video call, there may be any number of things that could distract the user from the call at hand. For example, the user may operate their endpoint for the call to perform other tasks (e.g., using applications executing thereon) that may, or may not, be related to the call itself. Likewise, the user may have behavioral traits, such as reluctance to make eye contact, that result in undesirable behavior on a video call. Even if the user is willing to make adjustments to their behavior on a video call, the user may not be aware that anything requiring adjustment is occurring.

SUMMARY

The technology disclosed herein enables user notifications via a light emitter associated with a video camera. In a particular embodiment, a method provides exchanging video user communications on the video communication session between a first endpoint operated by a first user and a second endpoint operated by a second user. The method further includes receiving video of the first user for inclusion in the video user communications using a video camera for the first endpoint and monitoring first behavior of the first user during the video communication session to determine whether the first behavior satisfies a notification criterion. In response to determining that the first behavior satisfies the notification criterion, the method includes directing a light emitter associated with the video camera to present a visual notification to the first user.

In some embodiments, directing the light emitter to present the visual notification comprises directing the light emitter to emit light of a particular color.

In some embodiments, directing the light emitter to present the visual notification comprises directing the light emitter to emit light in a particular pattern.

In some embodiments, directing the light emitter to present the visual notification comprises directing the light emitter to emit light in the shape of one or more characters.

In some embodiments, the notification criterion indicates when the first user should make a change to the first behavior and wherein the visual notification directs the user to make the change.

In some embodiments, the change to the first behavior comprises an increase in eye contact with the video camera and wherein the visual notification directs the user to increase eye contact with the video camera.

In some embodiments, the light emitter comprises one or more light emitting diodes (LEDs).

In some embodiments, the light emitter comprises a graphical display screen.

In some embodiments, the light emitter and the video camera are in a same sightline of the first user when the video camera is capturing the video.

In some embodiments, the light emitter is included in a housing with the video camera.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to exchange video user communications on the video communication session between a first endpoint operated by a first user and a second endpoint operated by a second user. The program instructions further direct the processing system to receive video of the first user for inclusion in the video user communications using a video camera for the first endpoint and monitor first behavior of the first user during the video communication session to determine whether the first behavior satisfies a notification criterion. In response to determining that the first behavior satisfies the notification criterion, the program instructions to direct a light emitter associated with the video camera to present a visual notification to the first user.

DETAILED DESCRIPTION

The light emitters, such as light emitting diodes and display screens, described below provide notifications to users in association with a video camera that captures images of the users. Using a light emitter associated with the video camera enables a user to more easily recognize that a notification from the light emitter is related to the video camera in some manner. For example, the user may be participating in a video communication session using the video camera and the light emitter may be configured to provide the user with notifications related to the video communication session (e.g., provide coaching for how to better present themselves on video). Preferably, the light emitter is positioned nearby the video camera such that the user can see the light emitter without having to take their eyes off of the video camera, at least to the point that someone viewing the video would think the user is still making eye contact with the video camera. Likewise, if the user is not looking at the video camera, then a notification from the light emitter positioned nearby the video camera may also serve the purpose of drawing the user's eyes back to the video camera when initially seen in the user's peripheral vision. Although, the light emitter may be associated with the video camera in some other manner, such as informing the user that the light emitter is configured to provide notifications related to the video camera.

Figure 1:
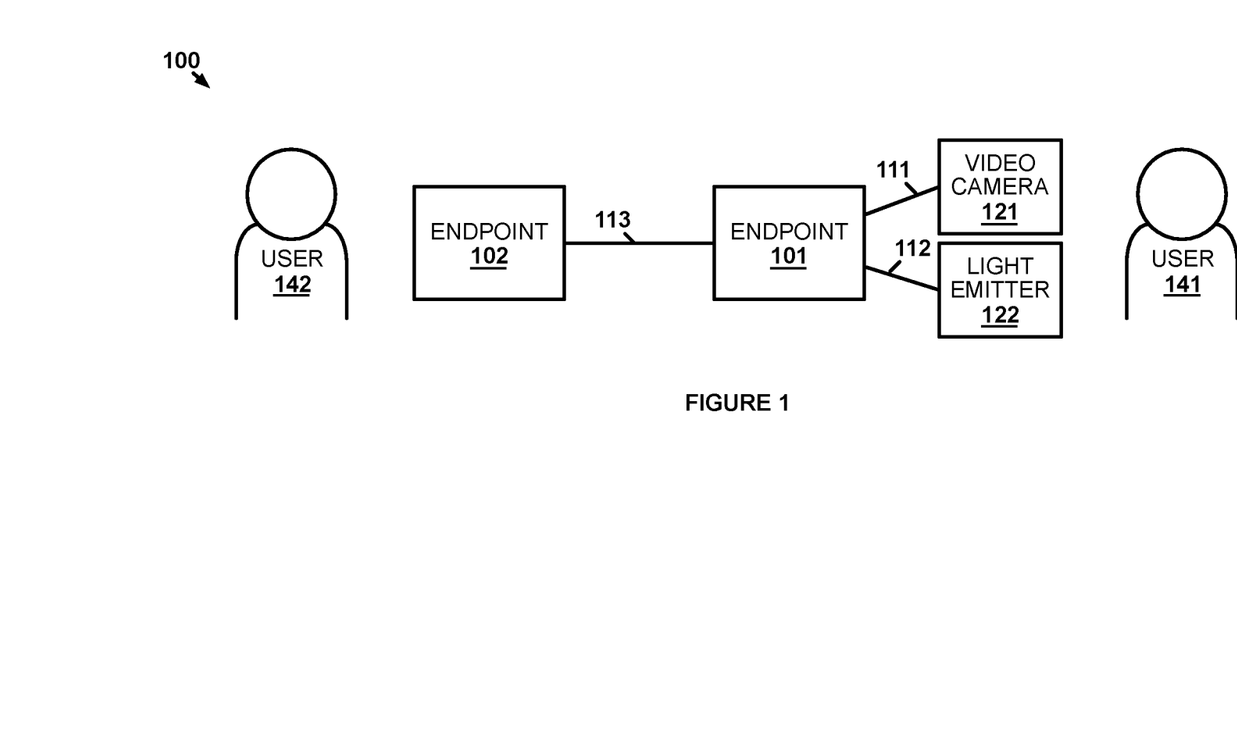
FIG. 1 illustrates an implementation for notifying a user via a light emitter associated with a video camera.

FIG. 1 illustrates implementation 100 for notifying a user via a light emitter associated with a video camera. Implementation 100 includes endpoint 101, endpoint 102, video camera 121, and light emitter 122. Endpoint 101 and video camera 121 communicate over communication link 111.

Endpoint 101 and light emitter 122 communicate over communication link 112. Endpoint 101 and endpoint 102 communicate over communication link 113. Endpoint 101/102 may be a telephone, laptop, personal computer, tablet computer, or some other type of user operable computing system. Though shown as separate devices, video camera 121 and light emitter 122 may be incorporated into a single device. Similarly, either or both of video camera 121 and light emitter 122 may be incorporated into endpoint 101. Though not shown, endpoint 102 may also have a video camera and/or light emitter coupled thereto. Communication links 111-112 may be wired or wireless links with endpoint 101 or may be internal links, including system buses, in examples where video camera 121 and/or light emitter 122 are incorporated into the endpoint 101 device. Communication links 111-113 are shown as direct links but may include intervening systems, networks, and/or devices.

In operation, user 142 operates endpoint 102 and user 141 operates endpoint 101. Video camera 121 captures video of user 141 for use by endpoint 101 on a real-time video communication session with endpoint 102. User 142 can view the video of user 141 received over the communication session. In other examples, endpoint 101 may use video captured by video camera 121 for other purposes, such as recording a video message from user 141. Endpoint 101 uses light emitter 122 to provided notifications to user 141 during the video communication session. The notifications in this example relate to user 141's behavior on the communication session (e.g., instructions for where to look, what to say, etc.). Although, in other examples, the notifications may provide other types of information/instructions to user 141.

Figure 2:
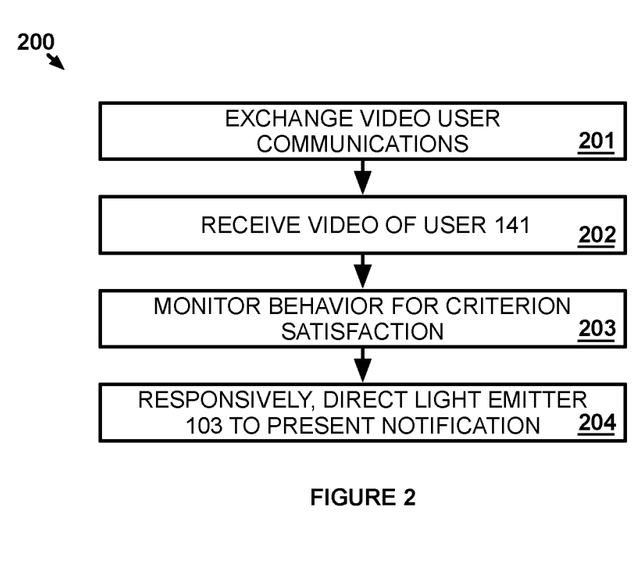
FIG. 2 illustrates an operational scenario that notifies a user via a light emitter associated with a video camera.

FIG. 2 illustrates operational scenario 200 that notifies a user via a light emitter associated with a video camera. In operational scenario 200, endpoint 101 exchanges video user communications on a video communication session between endpoint 101 and endpoint 102 (201). The video communication session may be a one-on-one communication between user 141 and user 142 or may be a video conference between user 141, user 142, and potentially other not-shown participants. The communication session may be established in any video-capable communication session protocol, such as Web Real-Time Communication (WebRTC), Session Initiation Protocol (SIP), or H.323. Likewise, the video on the video communication session may be encoded using any type of video codec, such as H.264, H.265, or VP9. In some examples, endpoint 101 may execute a client application to handle video communication sessions.

Endpoint 101 receives video of user 141 for inclusion in the video user communications using video camera 121 for endpoint 101 (202). Video camera 121 includes a camera lens, image sensor, and processing circuitry necessary to capture and provide endpoint 101 with video. Video camera 121 may be a video camera peripheral that connects to endpoint 101 via a wired, such as Universal Serial Bus (USB), or wireless connection, such as WiFi. Alternatively, video camera 121 may be built into endpoint 101, such a camera built into a display bezel of endpoint 101. When user 141 faces video camera 121, video camera 121 captures video of user 141 that, when presented at endpoint 102, gives user 142 the impression that user 141 is looking at them. The user communications exchanged on the video communication session between endpoint 101 and endpoint 102 at least include the video of user 141 captured by video camera 121 but may also include video of user 142 captured by a video camera at endpoint 102. The user communications may also include voice communications from user 142 and/or user 141 captured at endpoint 102 and endpoint 101, respectively.

Endpoint 101 monitors behavior of user 141 during the video communication session to determine whether the behavior satisfies a notification criterion (203). The behavior may include how user 141 is presenting themselves in the captured video or audio for the communication session. As such, the behavior may include characteristics indicating whether and/or how much user 141 is making eye contact with video camera 121, facial expressions being made by user 141, a speed in which user 141 is talking, whether user 141 is enunciating their words, whether user 141 is pacing the conversation properly (e.g., whether the conversation should be wrapping up or, otherwise, should move on to another stage), or some other indication of how user 141 is behaving on the video communication session. The behavior may be determined by performing image analysis on the video captured of user 141 and/or by performing audio analysis of user 141's voice, as captured by a microphone for endpoint 101.

The notification criterion may be used on its own or may be part of notification criteria having criterions associated with respective different types of notifications. For example, one criterion may define when user 141 is speaking too fast while another defines when user 141 is not looking into video camera 121 enough. The notification criterion may comprise a threshold value that relates to the type of notification that is associated therewith. For instance, a words per minute value may be used to define when user 141 is speaking too fast (e.g., the criterion for a slow down notification would be satisfied if user 141 speaks faster than the words per minute value). Alternatively, an amount of time value may be used to define when user 141 is not looking into video camera 121 enough (e.g., the criterion for a notification to look into the camera may be satisfied if user 141 does not look into video camera 121 for the amount of time over a given period, such as the previous two minutes). The threshold may also be defined a discrete number of occurrences in general, per period of time, per communication session, or otherwise. For example, user 141 may be required to smile or say certain things on the communication session a particular number of times. The notification criterion would be satisfied if that number of times is not met. Likewise, a similar discrete value may be used if user 141 is doing something too many times. For instance, the value may define a number of times in which user 141 uses the word "um" and the criterion is satisfied when user 141 meets or exceeds the number. Other manners of defining when a notification should be presented to user 141 may also be used.

In response to endpoint 101 determining that the behavior satisfies the notification criterion, endpoint 101 directs light emitter 122, associated with the video camera 121, to present a visual notification to user 141 (204). Light emitter 122 is associated with video camera 121 such that user 141 recognizes the visual notification as being related to an activity that is using video camera 121, which is the video communication session in this example. Preferably, light emitter 122 is positioned in the same sightline as video camera 121 so that user 141 can be notified without having to overt their gaze from video camera 121 to see the visual notification. Light emitter 122 may include one or more discrete light elements, such as incandescent bulbs or Light emitting diodes, which may be capable of emitting a single color or multi-color light. Light emitter 122 may also (or instead) include a graphical display screen capable of at least displaying characters, such as one or more seven segment displays, a liquid crystal display (LCD), an organic light emitting diode (OLED) display, or some other type of display. Light emitter 122 may further include processing circuitry capable of receiving instructions from endpoint 101 and presenting visual notifications in response to those instructions. In other examples, light emitter 122 may simply receive power from endpoint 101 that enables light emitter 122 to begin emitting light. Light emitter 122 may be combined with video camera 121 as a single device (e.g., may share a housing) or may be a separate device from video camera 121.

Endpoint 101 may transfer a signal or message to light emitter 122 that instructs light emitter 122 to present the visual notification. The visual notification indicates to user 141 that user 141's behavior has satisfied the notification criterion so that user 141 can change their behavior accordingly. The visual notification may be as simple as turning on a light of light emitter 122 regardless of color. For instance, light emitter 122 may be an single LED in video camera 121 that is commonly used to indicate that the camera is on and capturing video, although, in this case, that LED is repurposed to serve as the visual notification. In more complex examples, depending on the capabilities of light emitter 122 (e.g., number of light elements, color capabilities, display type, etc.), light emitter 122 may be configured to present the visual notification in another manner. For example, the visual notification may comprise emitting light in a particular blinking pattern, color, color pattern, or some other type of light emission that user 141 would recognize as being a visual notification. If light emitter 122 includes a graphical display, then light emitter 122 may present an explicit message, symbol, pictograph, or other type of graphic conveying the visual notification. In some examples, the particular visual notification corresponds to a particular notification criterion being satisfied. For example, satisfaction of one criterion may enable light emitter 122 to emit light in a particular pattern or color while satisfaction of another criterion may enable light emitter 122 to emit light in a different pattern or color.

Advantageously, light emitter 122 is able to present visual notifications to user 141 related to the use of video camera 121 without having to use an display/interface of endpoint 101 that is used for other purposes (e.g., for displaying a desktop or application window). Unlike other displays, light emitter 122 is able to be positioned nearby video camera 121 such that user 141 can maintain eye contact with video camera 121 while still receiving notifications.

Figure 3:
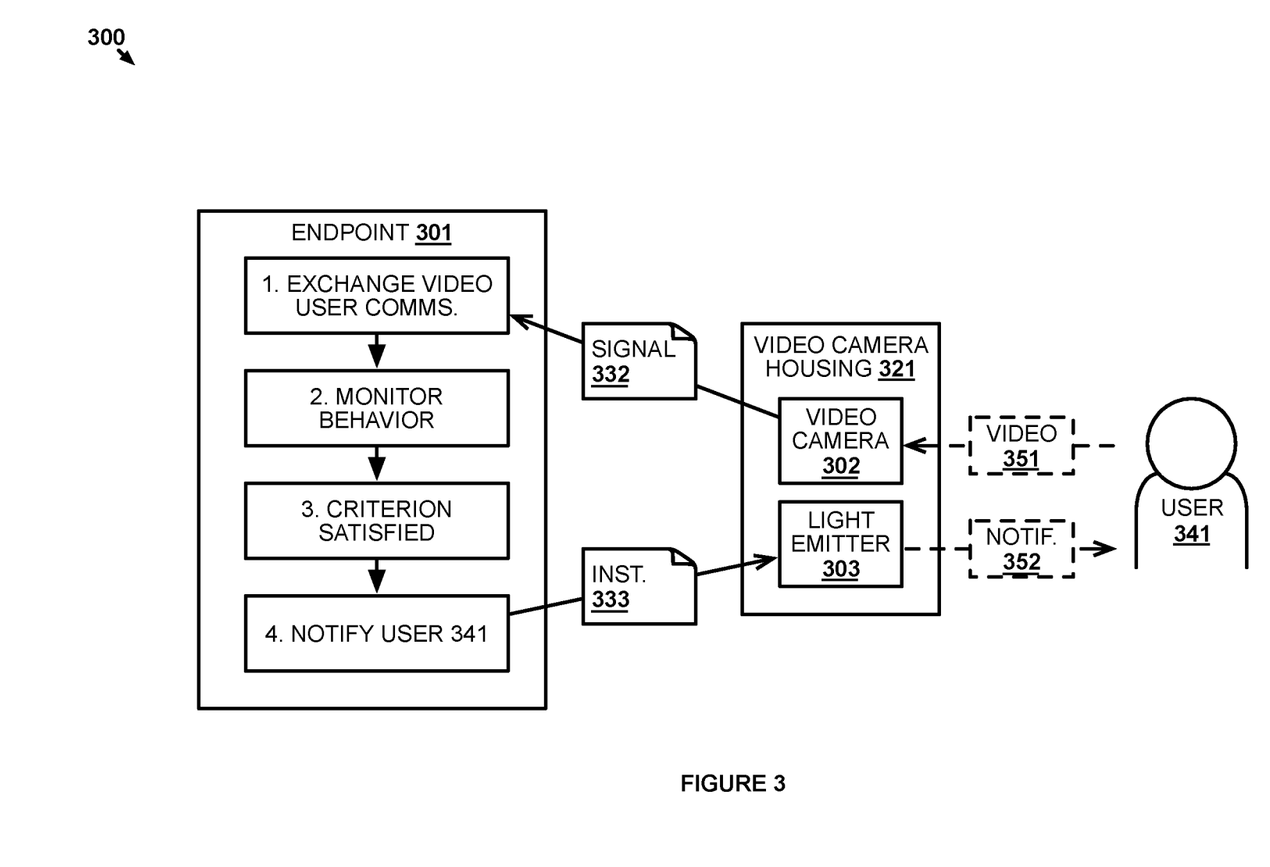
FIG. 3 illustrates another operational scenario that notifies a user via a light emitter associated with a video camera.

FIG. 3 illustrates operational scenario 300 that notifies a user via a light emitter associated with a video camera. Operational scenario 300 involves endpoint 301, video camera housing 321, and user 341. Video camera housing 321 includes video camera 302 and light emitter 303, although, in other examples, light emitter 303 may be included in its own housing. Likewise, while shown separately, video camera housing 321 may be incorporated into endpoint 301 (e.g., video camera 302 and light emitter 303 may be housed in a bezel of a display for endpoint 301). Endpoint 301 is an example of endpoint 101, video camera 302 is an example of video camera 121, and light emitter 303 is an example of light emitter 122.

In operation, video camera 302 captures video 351 of user 341. That is, the video image of video 351 captured by video camera 302 includes user 341 therein. The captured video 351 is converted into video signal 332 which is transferred to endpoint 301. Video signal 332 may be transferred in any protocol compatible with a wireless or wired link between video camera 302 and endpoint 301.

Endpoint 101 exchanges real-time video user communications at step 1 with one or more other endpoints on a video communication session with endpoint 301. The video user communications include video 351 obtained by endpoint 301 from video signal 332. Due to the real-time nature of the video user communications, video signal 332 may comprise a video stream from video camera 302 to endpoint 301. Endpoint 301 may simply transmit video user communications may simply transmit video signal 332 unmodified to other endpoints or endpoint 301 may modify video 351 and/or video 351 for transmission (e.g., crop, compress, etc.) Additionally, the video user communications may include an audio component, such as user 341's voice captured with a microphone for endpoint 301. Though not discussed, endpoint 301 may receive video user communications from the other endpoints for display by endpoint 301 to user 341.

While exchanging the video user communications, endpoint 301 monitors the behavior of user 341 at step 2 to determine whether the behavior meets one or more criterions for generating a visual notification at step 3. The behavior is preferably monitored in real-time along with the exchange of the video user communications so that notifications can be presented to user 341 in real-time. Monitoring the behavior may include analyzing video 351 to identify behavior relevant to the one or more criterions. For example, the behavior may include facial expression made by user 341, eye contact with video camera 302 by user 341, positioning of user 341 within the image of video 351, or some other type of visual behavior. Monitoring the behavior may also, or instead, include analyzing the audio component of the video user communications for behavior relevant to the one or more criterions. For example, the behavior may include a tone of user 341's voice (e.g., angry, upbeat, etc.), words used by user 341, pauses in user 341's speech, or some other type of audible behavior.

When a criterion is satisfied during the behavior monitoring discussed above, endpoint 301 notifies user 341 at step 4 with visual notification 352. In this example, visual notification 352 corresponds to the particular criterion that was satisfied. Different visual notifications would correspond to other criterions that are satisfied in other examples. Since visual notification 352 corresponds to the particular criterion being satisfied, visual notification 352 is presented to notify the user of the particular criterion being satisfied so that user 341 can account for the criterion being satisfied (e.g., can correct the behavior to comply with desired communication policies, such as an eye contact amount requirement). To present visual notification 352, endpoint 301 transfers instruction 333 to light emitter 303. Instruction 333 may be transferred in any protocol recognized by light emitter 303. Instruction 333 instructs light emitter 303 to present visual notification 352 to user 341. Instruction 333 may simply identify visual notification 352 and rely on light emitter 303 to recognize, via processing circuitry therein, what needs to be presented to present visual notification 352. Alternatively, instruction 333 may provide explicit instructions for how to present visual notification 352 (e.g., may detail a pattern to display). In some examples, such as those where light emitter 303 comprises one or more LEDs, instruction 333 may comprise endpoint 301 powering on/off the LEDs to present visual notification 352. Regardless of instruction 333's form, light emitter 303 presents visual notification 352 to user 341 in response to receiving instruction 333.

While the above example focused on presenting a notification in response to behavior of user 341 satisfying a criterion. Other examples may present a visual notification for other reasons related to the communication session. For example, endpoint 301 may monitor the length of the session and present notifications to user 341 via light emitter 303 in response to the length reaching predefined timestamps, which may help user 341 with pacing of the session.

Figure 4:
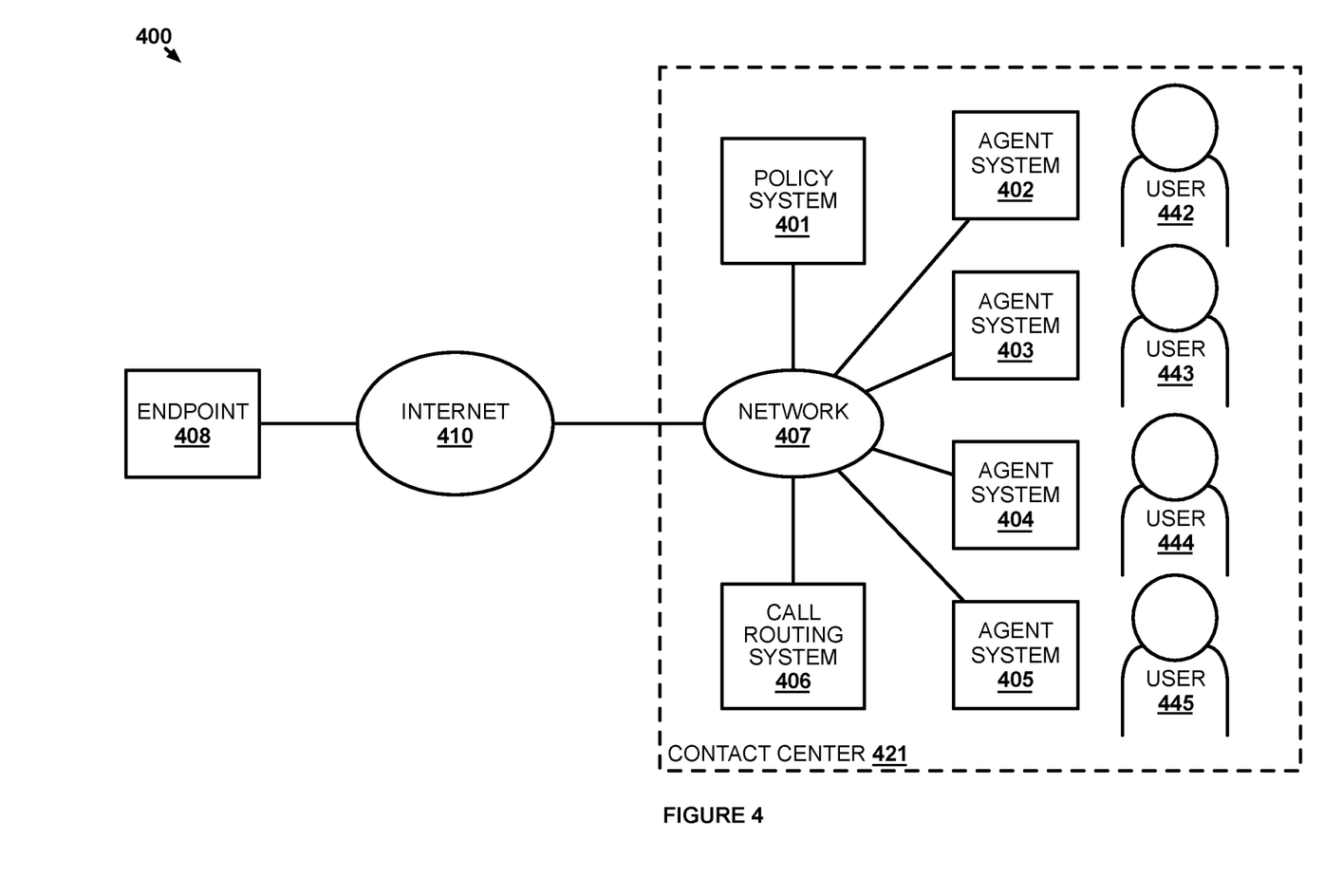
FIG. 4 illustrates an implementation for notifying a user via a light emitter associated with a video camera.

FIG. 4 illustrates implementation 400 for notifying a user via a light emitter associated with a video camera. Implementation 400 includes policy system 401, agent systems 402-405, call routing system 406, communication network 407, endpoint 408, and Internet 410. Policy system 401, agent systems 402-405, and communication network 407 are part of contact center 421 and communicate with each other over communication network 407. Users 442-445 operate respective agent systems 402-405 and are agents working in contact center 421 to handle video calls with users outside of contact center 421 (e.g., with customers of an entity operating contact center 421). Contact center 421 may be located in a single physical facility or may be distributed among multiple physical locations (e.g., multiple facilities, agent homes, etc.). As such, communication network 407 may be implemented, in part, over Internet 410 to connect multiple physical locations.

In operation, call routing system 406 determines which of users 442-445 should handle a call with contact center 421. The calls may be incoming or outgoing from contact center 421. When a user of users 442-445 is selected for a call, call routing system 406 routes the call to the associated agent system of agent systems 402-405 operated by the selected user (e.g., the selected user is logged into call routing system 406 using the associated agent system). In this example, policy system 401 provides centralized contact center policy management for when visual notifications should be presented to users 442-445. Each of the policies provides one or more criterions that, when satisfied at an agent system, trigger presentation of a visual notification at the agent system. The policies may be received from a user, such as a administrator of contact center 421, may be determined through machine learning on past calls with contact center 421, or may be determined in some other manner. In some examples, policy system 401 may be a user system that distributes policies and policy updates to agent systems 402-405 at the direction of its user. In other examples, policy system 401 may be a server system that may also perform other tasks in contact center 421.

Figure 5:
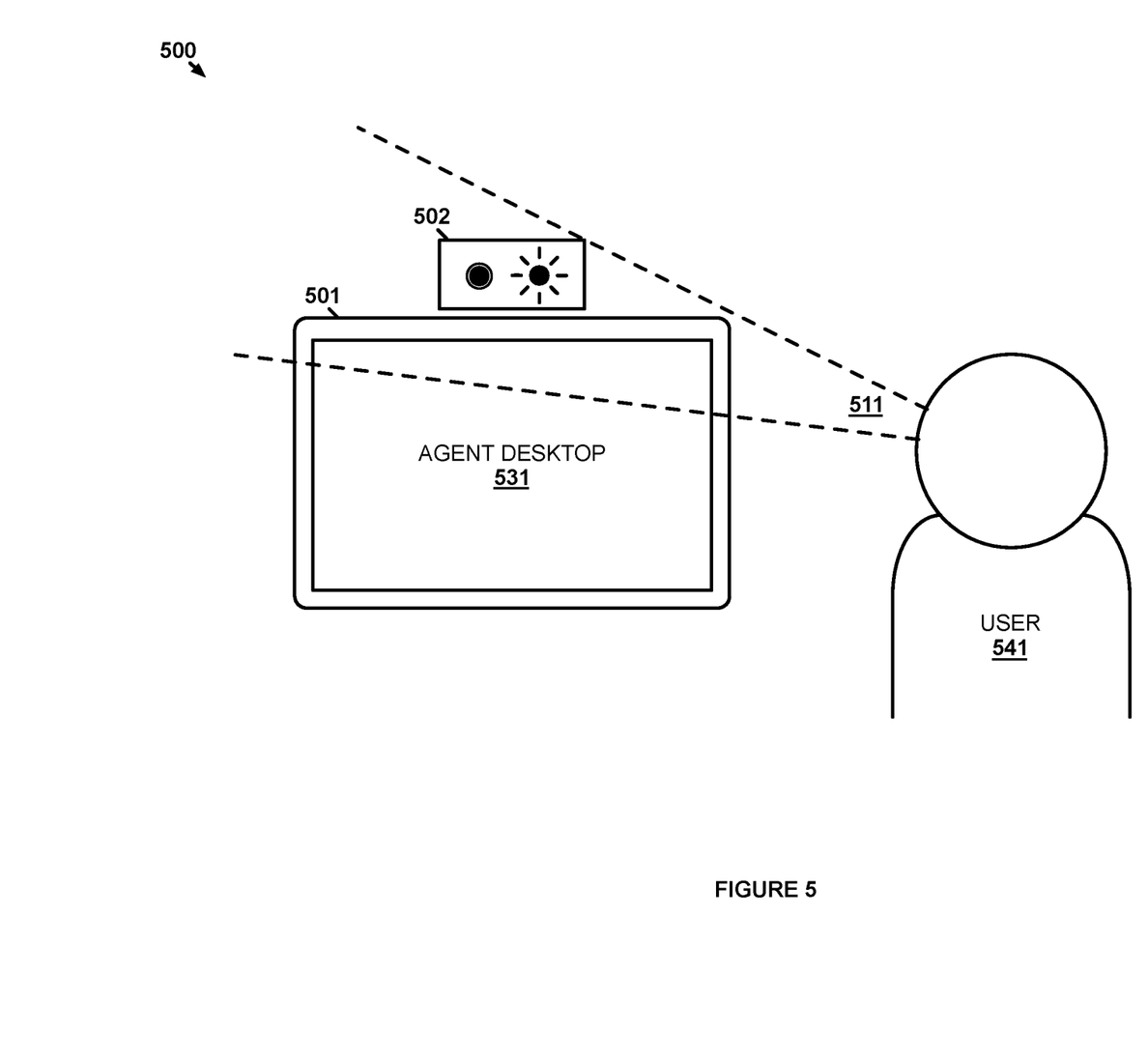
FIG. 5 illustrates another implementation for notifying a user via a light emitter associated with a video camera.

FIG. 5 illustrates implementation 500 for notifying a user via a light emitter associated with a video camera. Implementation 500 includes endpoint display 501 and video camera housing 502. Endpoint display 501 is a display of an endpoint operated by user 541. Video camera housing 502 includes a video camera and a light emitter for the endpoint. In some examples, video camera housing 502 may be included in endpoint display 501 and, in other examples, the video camera and the light emitter may be in separate housings. Collectively, endpoint display 501 and video camera housing 502 are included in an example of an agent system of agent systems 402-405 and user 541 is a corresponding user of users 442-445. Endpoint display 501 displays graphical agent desktop 531, which presents graphical user interfaces to software tools used by user 541 to carryout their duties as an agent of contact center 421.

In this example, the video camera and light emitter's inclusion in video camera housing 502 means they are in the same sightline 511 of user 541 when user 541 is looking at one or the other. User 541 should, therefore, not have to divert their gaze from the video camera in video camera housing 502 (at least not noticeably from the perspective of video captured of user 541 by the video camera in video camera housing 502) to view visual notifications presented by video camera housing 502's light emitter. Similarly, positioning the light emitter nearby the video camera, which is in the same video camera housing 502 in this example, means that should sightline 511 be focused on agent desktop 531 rather than video camera housing 502, as shown, then a visual notification from the light emitter would be seen in user 541's peripheral vision. As such, a visual notification in user 541's peripheral vision may draw sightline 511 to the video camera at the same time that user 541 moves sightline 511 towards the light emitter, which promotes eye contact with the video camera.

Figure 6:
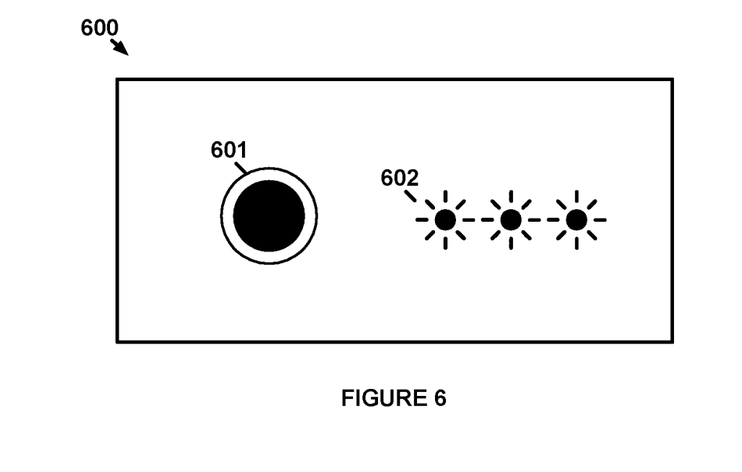
FIG. 6 illustrates a video camera housing for notifying a user via a light emitter associated with a video camera.

FIG. 6 illustrates video camera housing 600 for notifying a user via a light emitter associated with a video camera. Video camera housing 600 is an example of video camera housing 502 and includes video camera 601 and LEDs 602. While LEDs 602 in this example include three individual LEDs, other examples may include any number of LEDs. LEDs 602 may all be the same color or may be different colors from one another. Similarly, LEDs 602 may be multicolored LEDs. When displaying visual notifications, LEDs 602 may light in different patterns (e.g., particular ones of LEDs 602 may light up, blink, use a particular color, etc.) corresponding to different visual notifications. For example, one visual notification may light up the leftmost LED of LEDs 602 while another alternates blinking the leftmost and the right most LEDs of LEDs 602. A user viewing LEDs 602 will be expected to know what patterns correspond to what notifications in order to understand what information LEDs 602 are conveying.

Figure 7:
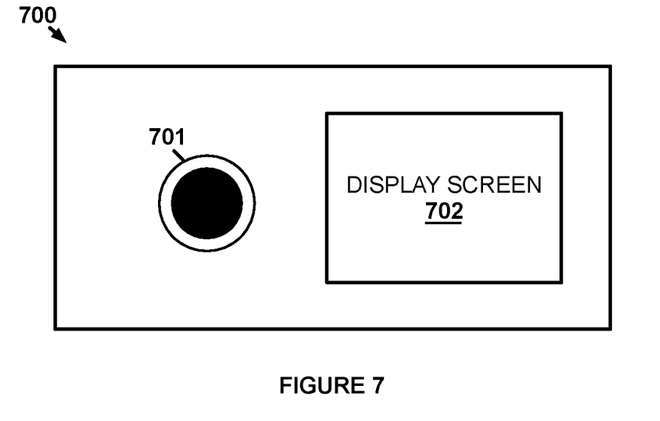
FIG. 7 illustrates a video camera housing for notifying a user via a light emitter associated with a video camera.

FIG. 7 illustrates video camera housing 700 for notifying a user via a light emitter associated with a video camera. Video camera housing 700 is another example of video camera housing 502 and includes video camera 701 and display screen 702. Display screen 702 may be an LCD, OLED, or other type of graphical display screen. Display screen 702 is relatively small compared to endpoint display 501 because display screen 702 is meant to display the visual notifications described herein rather than be used to operate an endpoint. For example, endpoint display 501 may measure over 20 inches diagonally while display screen 702 may measure only an inch. Display screen 702 may be sized such that display screen 702 can display and/or scroll characters, words, icons, or other type of graphical element that conveys information to a user. Even though it has limited size, display screen 702 can likely present more detailed information than LEDs 602. Likewise, visual notifications presented by display screen 702 need not be encoded into the patterns presented by LEDs 602.

In video camera housing 600 and video camera housing 700 discussed above, the video cameras 601 and 701 are on the left side of the respective light emitters, LEDs 602 and display screen 702. Other examples may orient the video cameras and light emitters differently. For example, the video camera may be positioned above the light emitter.

Figure 8:
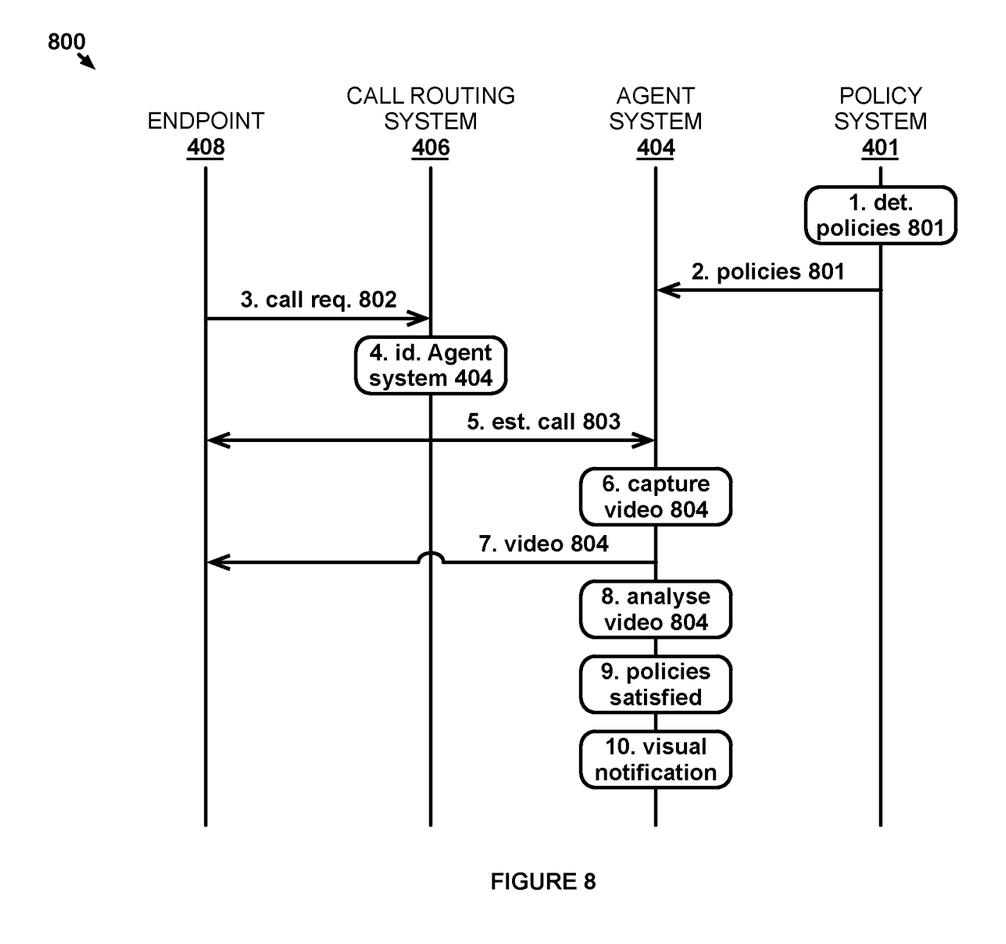
FIG. 8 illustrates an operational scenario that notifies a user via a light emitter associated with a video camera.

FIG. 8 illustrates operational scenario 800 that notifies a user via a light emitter associated with a video camera. In operational scenario 800, policy system 401 determines policies 801 at step 1. Policies 801 define different visual notifications to be presented upon satisfaction of respective criterions. The visual notifications may differ by being different light patterns, different character displays, or any other manner in which visual information may differ, which may depend on the type of light emitter (e.g., LEDs vs.

display screen). Presenting a different visual notification for satisfaction of different criterions allows the user viewing the visual notifications to differentiate between reasons for receiving the visual notifications. For example, the user would recognize one visual notification corresponding to a determination that there is not enough eye contact (i.e., one criterion is satisfied) while another visual notification corresponds to a determination that the conversation needs to wrap up (i.e., another criterion is satisfied). The user can then take action relevant to the particular visual notification.

Policy system 401 transfers policies 801 at step 2 to agent system 404. Policies 801 may update policies already being used by agent system 404 or may be a new set of policies. Though not shown, other agent systems of agent systems 402-405 may also receive policies 801. In some examples, the other agent systems may be provided with different policies than policies 801. For instance, the policies may differ depending on the respective duties of users 442-445. A user that is a supervisor may benefit from different visual notifications than one of the agents that reports the supervisor. Policy system 401 may, therefore, determine different policies for the supervisor than the agents under the supervisor.

Call routing system 406 receives call request 802 at step 3 from endpoint 408. Call request 802 requests a video call with one of the agents of contact center 421 (i.e., with one of users 442-445). In this example, call routing system 406 selects agent system 404 at step 4. Agent system 404 may be selected at random, based on a skill set of user 444, based on capabilities of agent system 404, or based on some other factor—including combinations thereof. After selecting agent system 404, call routing system 406 establishes call 803 between endpoint 408 and agent system 404 at step 5 in accordance with the selection. After establishment, user communications are exchanged between user 444 and the user of endpoint 408. Agent system 404 captures video 804 of user 444 at step 6 for inclusion in the user communications exchanged over call 803. Video 804 is captured by the video camera (e.g., video camera 601 or video camera 701) of video camera housing 502 for agent system 404. Agent system 404 transfers video 804 to endpoint 408 at step 7 over call 803 so that the user of endpoint 408 can view user 444 in the video image of video 804.

Agent system 404 also analyzes video 804 at step 8 to determine whether anything occurring in video 804 satisfies one or more of the criterions in policies 801. Agent system 404 may also analyze other aspects of call 803 (e.g., voice analysis, call duration, call phase, actions taken in applications on agent system 404, etc.) if policies 801 include criterion, and corresponding visual notifications, concerning those other aspects. In this example, agent system 404 determines that one or more of the criterions in policies 801 are satisfied at step 8. Agent system 404 then presents the visual notification that corresponds to the one or more criterions in policies 801 at step 10 to user 444. The visual notification is presented by the light emitter (e.g., LEDs 602 or display screen 702) of video camera housing 502 for agent system 404. In some examples, multiple visual notifications may correspond to the satisfaction of the one or more criterions. It may be possible, depending on type of light emitter, that agent system 404 is able to present multiple visual notifications at the same time (e.g., use one LED for one notification and another LED for a second notification). In alternative examples, the visual notifications may be presented sequentially at random, in order of importance as defined by policies 801, or in some other order. Similarly, agent system 404 may not present less important visual notifications in favor of more important visual notifications occurring at substantially the same time.

The above steps 8-10 occur in real-time during call 803. As such, substantially immediately upon the criterion being satisfied, agent system 404 determines that the criterion is satisfied and presents the visual notification to user 444. This provides immediate feedback to user 444 that user 444 can act upon. Video call client software executing on agent system 404 may be configured to also handle the presentation of visual notifications based on policies 801, as described above, or a separate application may handle such tasks.

Figure 9:
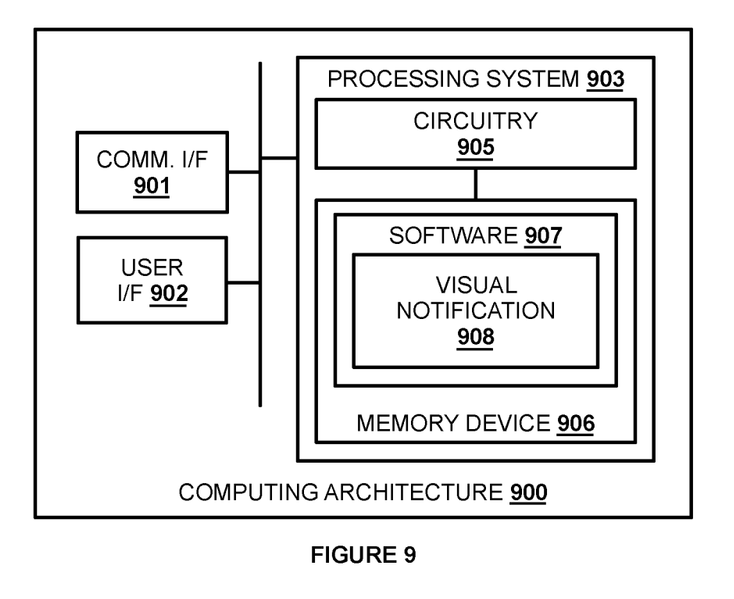
FIG. 9 illustrates a computing architecture for notifying a user via a light emitter associated with a video camera.

FIG. 9 illustrates computing architecture 900 for notifying a user via a light emitter associated with a video camera. Computing architecture 900 is an example computing architecture for endpoint 101, endpoint 301, and agent systems 402-405, although systems 101, 301, and 402-405 may use alternative configurations. A similar architecture may also be used for other systems described herein (e.g., policy system 401), although alternative configurations may also be used. Computing architecture 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a computer readable storage medium, such as a disk drive, flash drive, data storage circuitry, or some other memory apparatus. In no examples would a storage medium of memory device 906 be considered a propagated signal. Operating software 907 comprises computer programs, firmware, or some other form of machine-readable processing instructions. Operating software 907 includes visual notification module 908. Operating software 907 may further include an operating system, utilities, drivers, network interfaces, applications, or some other type of software. When executed by processing circuitry 905, operating software 907 directs processing system 903 to operate computing architecture 900 as described herein.

In particular, visual notification module 908 directs processing system 903 to exchange video user communications on the video communication session between a first endpoint operated by a first user and a second endpoint operated by a second user and receive video of the first user for inclusion in the video user communications using a video camera for the first endpoint. Visual notification module 908 further directs processing system 903 to monitor first behavior of the first user during the video communication session to determine whether the first behavior satisfies a notification criterion. In response to determining that the first behavior satisfies the notification criterion, visual notification module 908 directs processing system 903 to direct a light emitter associated with the video camera to present a visual notification to the first user.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for notifying a user on a video communication session, the method comprising:
   exchanging video user communications on the video communication session between a first endpoint operated by a first user and a second endpoint operated by a second user, wherein the first endpoint includes a user interface comprising a display;
   receiving video of the first user for inclusion in the video user communications using a video camera for the first endpoint;
   monitoring first behavior of the first user during the video communication session to determine whether the first behavior satisfies a notification criterion; and
   in response to determining that the first behavior satisfies the notification criterion, directing a light emitter associated with the video camera to present a visual notification to the first user, wherein the light emitter is distinct from the display, and wherein both the light emitter and the display face the first user during the video communication session.

2. The method of claim 1, wherein directing the light emitter to present the visual notification comprises:
   directing the light emitter to emit light of a particular color.

3. The method of claim 1, wherein directing the light emitter to present the visual notification comprises:
   directing the light emitter to emit light in a particular pattern.

4. The method of claim 1, wherein directing the light emitter to present the visual notification comprises:
   directing the light emitter to emit light in the shape of one or more characters.

5. The method of claim 1, wherein the notification criterion indicates when the first user should make a change to the first behavior and wherein the visual notification directs the user to make the change.

6. The method of claim 5, wherein the change to the first behavior comprises an increase in eye contact with the video camera and wherein the visual notification directs the user to increase eye contact with the video camera.

7. The method of claim 1, wherein the light emitter comprises one or more light emitting diodes (LEDs).

8. The method of claim 1, wherein the light emitter comprises a graphical display screen.

9. The method of claim 1, wherein the light emitter and the video camera are in a same sightline of the first user when the video camera is capturing the video.

10. The method of claim 1, wherein the light emitter is included in a housing with the video camera.

11. An apparatus for notifying a user on a video communication session, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    exchange video user communications on the video communication session between a first endpoint operated by a first user and a second endpoint operated by a second user, wherein the first endpoint includes a user interface comprising a display;
    receive video of the first user for inclusion in the video user communications using a video camera for the first endpoint;
    monitor first behavior of the first user during the video communication session to determine whether the first behavior satisfies a notification criterion; and
    in response to determining that the first behavior satisfies the notification criterion, direct a light emitter associated with the video camera to present a visual notification to the first user, wherein the light emitter is distinct from the display, and wherein both the light emitter and the display face the first user during the video communication session.

12. The apparatus of claim 11, wherein to direct the light emitter to present the visual notification, the program instructions direct the processing system to:
    direct the light emitter to emit light of a particular color.

13. The apparatus of claim 11, wherein to direct the light emitter to present the visual notification, the program instructions direct the processing system to:
    direct the light emitter to emit light in a particular pattern.

14. The apparatus of claim 11, wherein to direct the light emitter to present the visual notification, the program instructions direct the processing system to:
    direct the light emitter to emit light in the shape of one or more characters.

15. The apparatus of claim 11, wherein the notification criterion indicates when the first user should make a change to the first behavior and wherein the visual notification directs the user to make the change.

16. The apparatus of claim 15, wherein the change to the first behavior comprises an increase in eye contact with the video camera and wherein the visual notification directs the user to increase eye contact with the video camera.

17. The apparatus of claim 11, wherein the light emitter comprises one or more light emitting diodes (LEDs).

18. The apparatus of claim 11, wherein the light emitter comprises a graphical display screen.

19. The apparatus of claim 11, wherein the light emitter and the video camera are in a same sightline of the first user when the video camera is capturing the video.

20. One or more computer readable storage media having program instructions thereon for notifying a user on a video communication session, the program instructions, when read and executed by a processing system, direct the processing system to:
    exchange video user communications on the video communication session between a first endpoint operated by a first user and a second endpoint operated by a second user, wherein the first endpoint includes a user interface comprising a display;
    receive video of the first user for inclusion in the video user communications using a video camera for the first endpoint;

monitor first behavior of the first user during the video communication session to determine whether the first behavior satisfies a notification criterion; and in response to determining that the first behavior satisfies the notification criterion, direct a light emitter associated with the video camera to present a visual notification to the first user, wherein the light emitter is distinct from the display, and wherein both the light emitter and the display face the first user during the video communication session.

* * * * *